US008036462B2

(12) United States Patent
Can et al.

(10) Patent No.: US 8,036,462 B2
(45) Date of Patent: Oct. 11, 2011

(54) AUTOMATED SEGMENTATION OF IMAGE STRUCTURES

(75) Inventors: Ali Can, Troy, NY (US); Xiaodong Tao, Niskayuna, NY (US); Harvey Ellis Cline, Schenectady, NY (US); Paulo Ricardo Mendonca, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1171 days.

(21) Appl. No.: 11/680,063

(22) Filed: Feb. 28, 2007

(65) Prior Publication Data

US 2008/0031521 A1 Feb. 7, 2008

Related U.S. Application Data

(63) Continuation-in-part of application No. 11/606,582, filed on Nov. 30, 2006, which is a continuation-in-part of application No. 11/500,028, filed on Aug. 7, 2006.

(51) Int. Cl.
G06K 9/34 (2006.01)
(52) U.S. Cl. ........................................ 382/173; 382/171
(58) Field of Classification Search .................. 382/171, 382/173
See application file for complete search history.

(56) References Cited

U.S. PATENT DOCUMENTS

| 5,888,743 A | 3/1999 | Das |
| 5,995,645 A | 11/1999 | Soenksen et al. |
| 6,150,173 A | 11/2000 | Schubert |
| 6,160,617 A | 12/2000 | Yang |
| 6,195,451 B1 | 2/2001 | Kerschmann et al. |
| 6,573,043 B1 | 6/2003 | Cohen et al. |
| 6,995,020 B2 | 2/2006 | Capiodieci et al. |
| 7,219,016 B2 | 5/2007 | Rimm et al. |
| 7,321,881 B2 | 1/2008 | Saidi et al. |
| 7,467,119 B2 | 12/2008 | Saidi et al. |
| 7,483,554 B2 | 1/2009 | Kotsianti et al. |
| 7,505,948 B2 | 3/2009 | Saidi et al. |
| 7,709,222 B2 | 5/2010 | Rimm et al. |
| 2002/0076092 A1 | 6/2002 | Ellis et al. |
| 2002/0164063 A1* | 11/2002 | Heckman ...................... 382/133 |
| 2002/0177149 A1 | 11/2002 | Rimm et al. |
| 2002/0187487 A1 | 12/2002 | Goldenring et al. |
| 2003/0036855 A1 | 2/2003 | Harris et al. |
| 2003/0077675 A1 | 4/2003 | Das |
| 2003/0184730 A1* | 10/2003 | Price .............................. 356/39 |

(Continued)

FOREIGN PATENT DOCUMENTS

EP 0345953 B1 7/1994

(Continued)

OTHER PUBLICATIONS

PCT/US2007/074380, PCT Search Report, Jun. 2, 2009.

(Continued)

Primary Examiner — Bhavesh Mehta
Assistant Examiner — Eueng-Nan Yeh
(74) Attorney, Agent, or Firm — Jenifer E. Haeckl

(57) ABSTRACT

Methods and systems for segmenting images, wherein the image pixels are categorized into a plurality of subsets using one or more indexes, then a log-likelihood function of one or more of the indexes is determined, and one or more maps are generated based on the determination of the log-likelihood function of one or more of the indexes.

6 Claims, 11 Drawing Sheets

U.S. PATENT DOCUMENTS

| | | | |
|---|---|---|---|
| 2004/0023320 | A1 | 2/2004 | Steiner et al. |
| 2004/0197839 | A1 | 10/2004 | Daniely et al. |
| 2004/0248325 | A1 | 12/2004 | Bukusoglul |
| 2005/0267690 | A1 | 12/2005 | Cong et al. |
| 2006/0094868 | A1 | 5/2006 | Giuliano et al. |
| 2007/0016373 | A1 | 1/2007 | Hunter et al. |
| 2007/0099219 | A1 | 5/2007 | Teverovskiy et al. |
| 2007/0111251 | A1 | 5/2007 | Rosania et al. |
| 2008/0118916 | A1 | 5/2008 | Sood et al. |
| 2008/0118934 | A1 | 5/2008 | Gerdes et al. |
| 2008/0118944 | A1 | 5/2008 | Larsen et al. |
| 2008/0144895 | A1 | 6/2008 | Hunter et al. |
| 2010/0062452 | A1 | 3/2010 | Gustavson et al. |

FOREIGN PATENT DOCUMENTS

| | | |
|---|---|---|
| EP | 1416278 B1 | 11/2004 |
| WO | 02086498 A2 | 10/2002 |
| WO | WO2004038418 A1 | 5/2004 |
| WO | WO2006016697 A1 | 2/2006 |
| WO | 2007130677 A2 | 11/2007 |
| WO | 2007136724 A2 | 11/2007 |
| WO | 2008064067 A2 | 5/2008 |
| WO | 2008133727 A2 | 11/2008 |
| WO | 2008133728 A2 | 11/2008 |
| WO | 2008133729 A2 | 11/2008 |

OTHER PUBLICATIONS

W. Chen et al., "A Prototype for Unsupervised analysis of Tissue Microarrays for Cancer Research and Diagnostics," IEEE Transactions on Information Technology in Biomedicine, vol. 8, No. 2, Jun. 2004. pp. 89-96.

Thevenaz, Optimization of Mutual Information for Multiresolution Image Registration, *IEEE Transactions on Image Processing*, vol. 9, No. 12, pp. 2083-2099, Dec. 2000.

Ashburner et al., "Unified Segmentation", Academic Press, vol. 26, No. 3, Jul. 1, 2005, pp. 839-851.

Debruijne et al., "Multi-object Segmentation Using Shape Particles", Information Processing in Medical Imaging; vol. 3565. Jul. 10, 2005, pp. 762-773.

PCT Search Report & Written Opinion—Mar. 27, 2009.

Robert L. Camp et al., "Automated subcellular localization and quantification of protein expression in tissue microarrays", Nature Medicine, Nov. 2002, pp. 1323-1328, vol. 8, No. 11.

K. Martin Hoffman, et al., "Gastrointestinal Hormones Cause Rapid c-Met Receptor Down-regulation by a Novel Mechanism Involving Clathrin-mediated Endocytosis and a Lysosome-dependent Mechanism", Journal of Biological Chemistry, Dec. 8, 2006, pp. 37705-37719, vol. 281, No. 49.

Gagani Athauda et al., "c-Met Ectodomain Shedding Rate Correlates with Malignant Potential", Clin Cancer Res, Jul. 15, 2006, pp. 4154-4162, vol. 12, No. 14.

S. Kermorgant et al., "c-Met Signalling: Spatio-Temporal Decisions", Cell Cycle, Mar. 2005, pp. 352-355, vol. 4, Issue 3.

Wolfgang Hilbe, et al., "Comparison of automated cellular imaging system and manual microscopy for immunohistochemically stained cryostat sections of lung cancer specimens applying p53, Ki-67 and p120", Oncology Reports, May 13, 2003, pp. 15-20, vol. 10.

James D. Cowan et al., "Cruella, Develop mg a Scalable T ssue M Croarray Data Management System", Arch Pathol Lab Med, Jun. 2006, pp. 817-822, vol. 130.

T. Hothorn et al., "On the exact distribution of maximally selected rank statistics", Computational Statistics & Data Analysis, Jun. 2003, vol. 43, Issue 2, pp. 121-137.

C. Eguiluz et al. "Multitissue array review: A chronological description of tissue array techniques, applications and procedures", Pathology-Research and Practice, vol. 202, Apr. 4, 2006, pp. 561-568.

M. Mengel et al., "Standardized On-Slide Control for Quality Assurance in the Immunohistochemical Assessment of Therapeutic Target Molecules in Breast Cancer", The Breast Journal, vol. 11, No. 1, Jan.-Feb. 2005. pp. 34-40.

P. Capodieci et al., "Gene expression profiling in single cells within tissue," 2005 Nature Publishing Group, vol. 2, No. 9, Sep. 2005, pp. 663-665.

W. Schubert et al., : Analyzing proteome topology and function by automated multidimensional fluorescence microscopy, 2006 Nature Publishing Group, http://www.nature.com/naturebiotechnology, Oct. 2006, pp. 1-11.

W. Schubert, "Exploring Molecular Networks Directly in the Cell," 2006 International Society of Analytical Cytology, Cytometry Part A, vol. 69A, 2006, pp. 109-112.

R. F. Murphy, "A combination of microscope technology and statistical analysis enables the identification of proteins that share subcellular location patterns," 2006 Nature Publishing Group, Nature Biotechnology, vol. 24, No. 10, Oct. 2006, pp. 1223-1224.

T. W. Nattkemper et al., "Human vs. machine: evaluation of fluorescence micrographs," Pergamon, Computers in Biology and Medicine, Computers in Biology and Medicine, vol. 33, 2003, pp. 31-43.

T. W. Nattkemper et al., "A hybrid system for cell detection in digital micrographs," Paper presented @ Biomedical Engineering Conference, Feb. 16-18, 2004, 4 pages.

T.W. Nattkemper et al., "A Neural Network Architecture for Automatic Segmentation of Fluorescence Micrographs," ESANN' 2000 proceedings—European Symposium on Artificial Neural Networks, (Belgium), Apr. 26-28, 2000, ISBN 2-930307-00-5, pp. 177-182.

A. V. Kuznetsov et al., "Functional Imaging of Mitochondria in Saponin-permeabilized Mice Muscle Fibers," The Journal of Cell Biology, vol. 140, No. 5, Mar. 9, 1998, pp. 1091-1099.

K. Rodenacker et al., "A feature set for cytometry on digitized mircroscopic images," Analytical Cellular Pathology, vol. 25, No. 1, pp. 1-36, 2003.

F. Erlandsson et al., "Abnormal Expression Pattern of Cyclin E in Tumor Cells," International Journal Cancer, vol. 104, Apr. 10, 2003, pp. 369-375.

Van Vlierberghe et al., "Four-color staining combining fluorescence and Brightfield microscopy for simultaneous immune cell Phenotyping and localization in tumor tissue sections," Microscopy research and Technique, vol. 67, Jul. 15, 2005, pp. 15-21, Abstract.

J. Lindblad et al., "Image Analysis for Automatic Segmentation of Cytoplasms and Classifications of Rac1 Activation," Cytometry Part A, vol. 57A, pp. 22-23, Jan. 2004.

A. O. H. Gerstner et al., "Quantitative Histology by Multicolor Slide-Based Cytometry," Cytometry Part A, vol. 59A, pp. 210-219, Jun. 2004.

C. Wahlby et al., "Sequential Immunofluorescence Staining and Image Analysis for Detection of Large Numbers of Antigens in Individual Cell Nuclei," Cytometry 47, pp. 32-41,, Jan. 1, 2002.

M.L. Hermiston et al., "Simultaneous localization of six antigens in single sections of transgenic mouse intestive using a combination of light and fluorescence microscopy," The Journal of Histochemistry and Cytochemistry, vol. 40, No. 9, pp. 1283-1290, Sep. 2002.

R. T. Altstock et al., "Algorithms for Quantitation of Protein Expression Variation in Normal Versus Tumor Tissue as a Prognostic Factor in Cancer: Met Oncogene Expression, and Breast Cancer as a Model," Cytometry 41, pp. 155-165, Nov. 2000.

J.B. Antoine Maintz et al., "A Survey of Medical Image Registration," Medical Image Analysis, vol. 2, No. 1, Mar. 1998, pp. 1-37.

* cited by examiner (a)　　　　　　　　(b)
(c)　　　　　　　　(d)
(e)　　　　　　　　(f)

(a)

(b)

(a) (b)

AUTOMATED SEGMENTATION OF IMAGE STRUCTURES

CROSS-REFERENCE TO RELATED APPLICATIONS

This is a continuation-in-part of U.S. patent application Ser. No. 11/606,582, entitled "System and Methods for Scoring Images of a Tissue Micro Array, filed on Nov. 30, 2006, which is herein incorporated by reference.

BACKGROUND

The invention relates generally to digital image processing and analysis.

Segmentation of ridge-like and blob-like structures is one of the segmentation tasks used in medical and life sciences imaging applications. Such applications typically detect vessels, bronchial trees, bones, and nodules in medical applications, and neurons, nuclei, and membrane structures in microscopy applications. For example, partitioning a multiple channel digital image into multiple segments (regions/compartments) is one of the steps used to quantify one or more biomarkers in molecular cell biology, molecular pathology, and pharmaceutical research.

BRIEF DESCRIPTION

The methods and systems in part provide a likelihood function estimator that may be adapted to generate probability maps of ridge-like and blob-like structures in images. Such probability maps may be used to encode the segmentation information of different shapes in images using probability values between zero and one. One or more of the example embodiments of the methods iteratively estimates empirical likelihood functions of curvature and intensity based features. Geometric constraints may be imposed on the curvature feature to detect, for example, nuclei or membrane structures in fluorescent images of tissues. The methods may be configured to be non-parametric and to learn the distribution functions from the data. This is an improvement over existing parametric approaches, because the methods enable analysis of arbitrary mixtures of blob and ridge like structures. This is highly valuable for applications, such as in tissue imaging, where a nuclei image in an epithelial tissue comprises both ridge-like and blob-like structures.

An embodiment of one of the methods for segmenting images, generally comprises the steps of, providing an image comprising a plurality of pixels; categorizing the pixels into a plurality of subsets using one or more indexes; determining a log-likelihood function of one or more of the indexes; and generating one or more maps, such as a probability map, based on the determination of the log-likelihood function of one or more of the indexes. The subsets may comprise background pixels, foreground pixels and indeterminate pixels. The indexes may comprise one or more features such as, but not limited to, a shape index, a normalized-curvature index or an intensity value.

The step of determining may comprise estimating the log-likelihood function of one or more of the indexes, wherein the pixels may be categorized using at least three, but not necessarily limited to, of the indexes and wherein the step of determining a log-likelihood function comprises using two out of the three indexes, for an iteration of the step of determining the log-likelihood function, to estimate the log-likelihood of the third indexes. These indexes may be used to estimate one or more class conditional probabilities and to estimate the log-likelihood of the third feature set, wherein the log-likelihood my be estimated for at least one of the indexes at least in part by estimating one or more decision boundaries. One or more of the decision boundaries may be used to apply one or more monotonicity constraints for one or more log-likelihood functions.

The image may comprise an image of a biological material, such as but not limited to a biological tissue that may comprise one or more cellular structures, wherein the cellular structures may comprise one or more blob-like and ridge-like structures.

An embodiment of a system for segmenting images, generally comprises, a storage device for at least temporarily storing the image; and a processing device that categorizes the pixels into a plurality of subsets using one or more indexes, determines a log-likelihood function of one or more of the indexes, and generates one or more maps based on the determination of the log-likelihood function of one or more of the indexes. The images may comprise, but are not limited to, blob-like and ridge-like structures. For example, one or more of the blob-like structures may comprise at least a portion of a nucleus and one or more of the ridge-like structures may comprise at least a portion of a membrane. One or more of the maps may be a probability map of one or more of the blob-like structures and the ridge-like structures. The image may comprise, but is not limited to, one or more structures selected from a group consisting of: cellular structures, vascular structures, and neural structures.

DRAWINGS

These and other features, aspects, and advantages of the present invention will become better understood when the following detailed description is read with reference to the accompanying drawings in which like characters represent like parts throughout the drawings, wherein:

FIG. 2a is an image of a retina used to illustrate one of the examples.

FIG. 2b illustrates the segmented foreground pixels based on the shape index and normalized-curvature index for the image shown in FIG. 2a.

FIG. 2c illustrates the segmented foreground pixels based on the shape index and intensity for the image shown in FIG. 2a.

FIG. 2d illustrates the segmented foreground pixels based on the intensity and normalized-curvature index for the image shown in FIG. 2a.

FIG. 2e illustrates an estimated probability map for the image shown in FIG. 2a.

FIG. 2f illustrates probability values greater than 0.5, indicating the pixels more likely to be vessels than being background, for the image shown in FIG. 2a.

Figure 2:
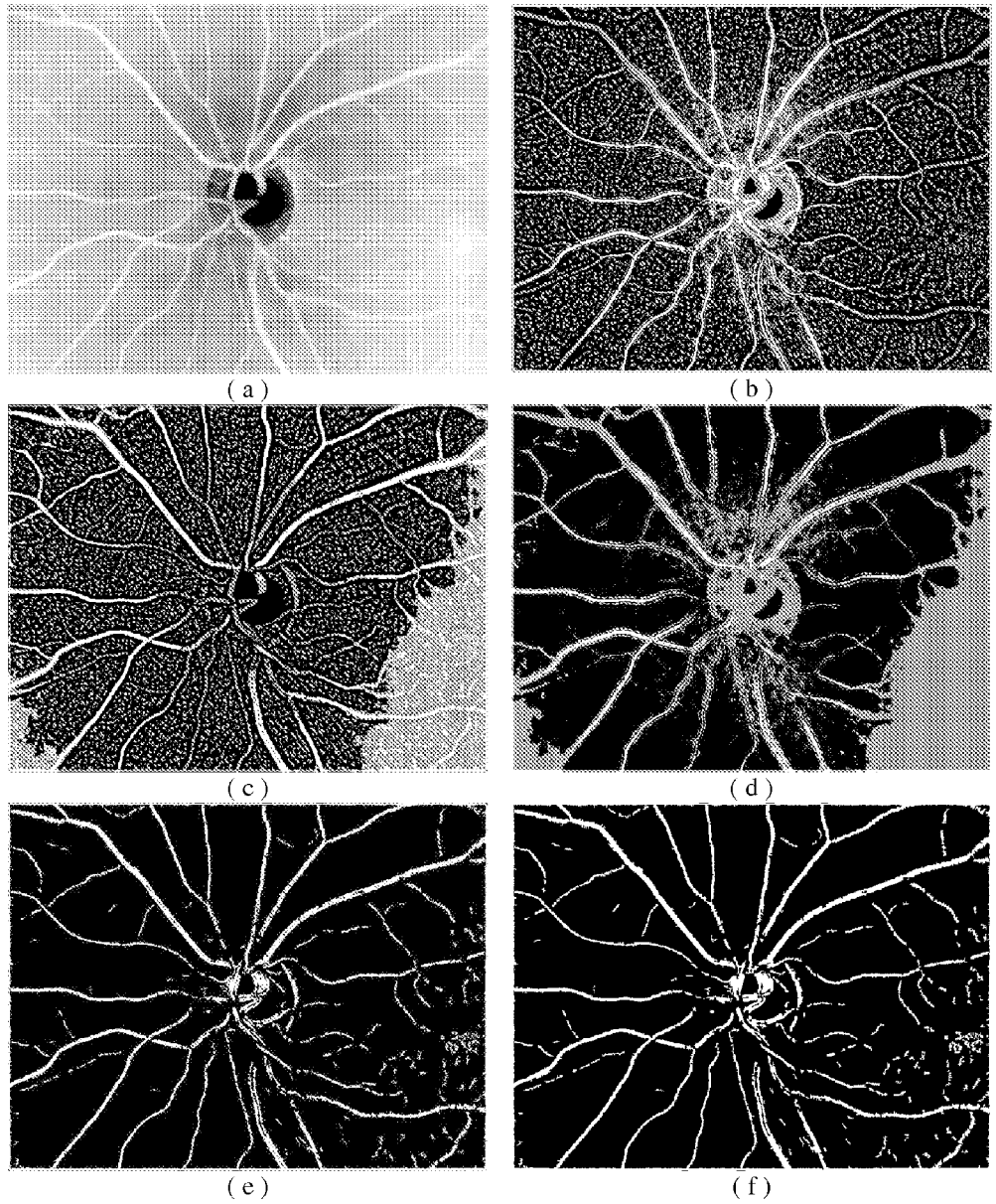

FIGS. 3a-3f illustrate the estimated class conditional distribution and log-likelihood functions of the retina image shown in FIG. 2a: a) illustrates the distribution functions of the intensity, c) illustrates the normalized-curvature index, e) illustrates the shape index. For FIGS. 2a, 2c and 2e, the distribution of foreground, background and all pixels are plotted with dotted, dashed, and solid lines, respectively. FIG. 2b illustrates the estimated log-likelihood functions based on the intensity, FIG. 2d illustrates the normalized-curvature index, and FIG. 2f illustrates the shape index.

Figure 4:
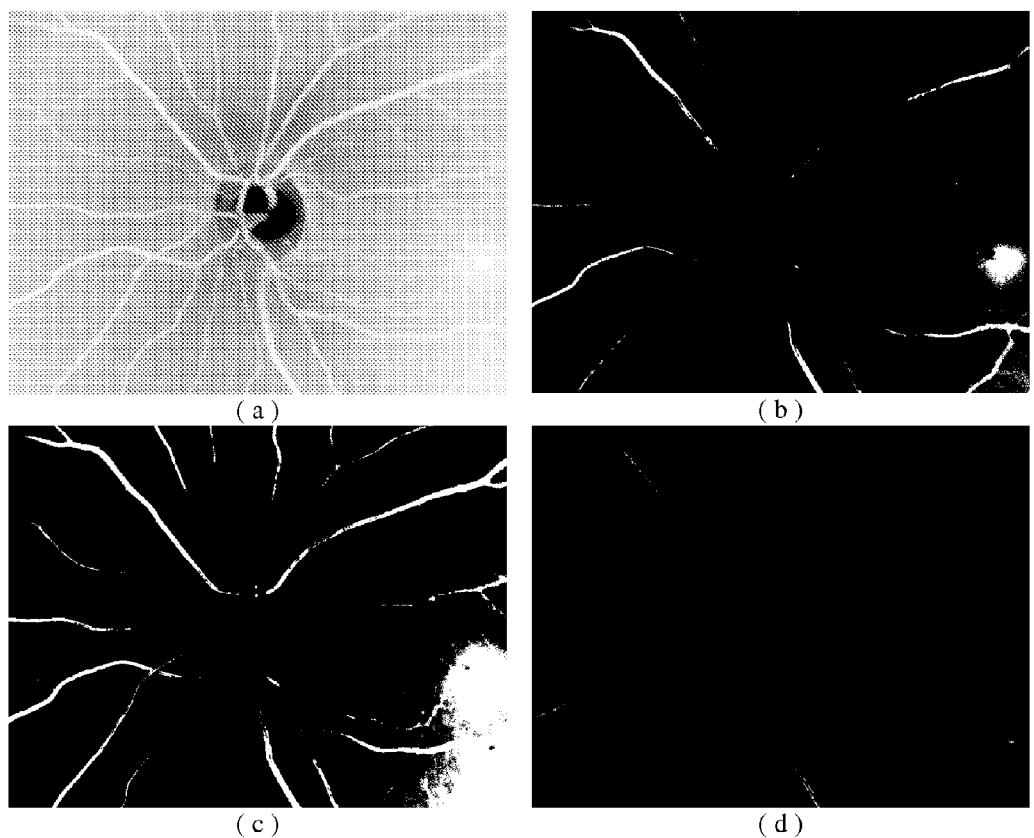

FIG. 4a is the image of the retina shown in FIG. 2a shown again for comparison to FIGS. 4b-4d.

FIG. 4b illustrates segmented pixels that have intensity value above a threshold, T for the image shown in FIG. 4a.

FIG. 4c illustrates segmented pixels when the threshold, T, is decreased by 5% for the image shown in FIG. 4a.

FIG. 4d illustrates segmented pixels when the threshold, T, is increased by 5% for the image shown in FIG. 4a.

Figure 5:
Figure 5:
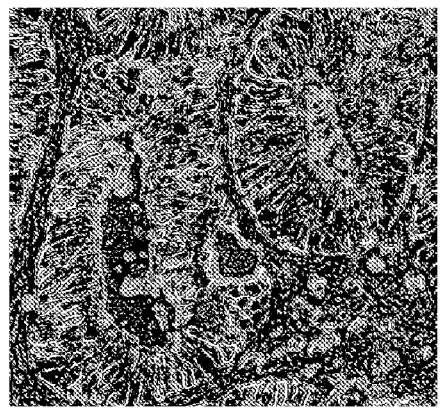
Figure 5:
Figure 5:
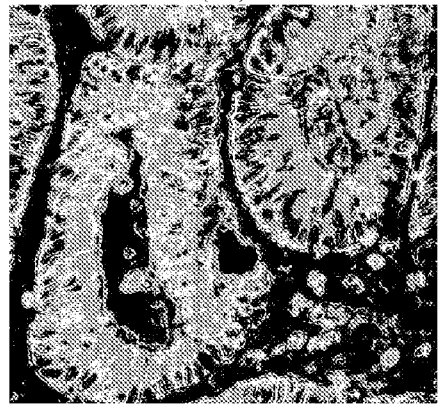
Figure 5:
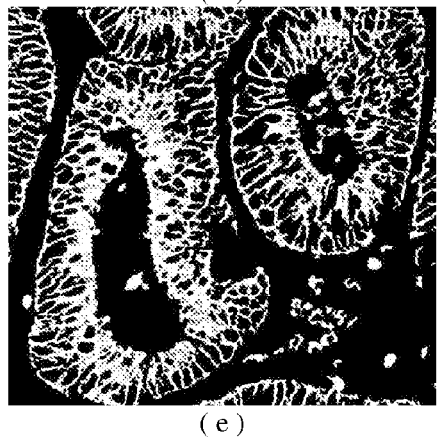
Figure 5:

FIG. 5a illustrates an image of a membrane marker and estimated foreground subsets (white color) and background subsets (black color) based on two of the features used in this example FIG. 5b illustrates the segmented foreground pixels based on the shape index and normalized-curvature index for the image shown in FIG. 5a.

FIG. 5c illustrates the segmented foreground pixels based on the shape index and intensity for the image shown in FIG. 5a FIG. 5d illustrates the segmented foreground pixels based on the intensity and normalized-curvature index for the image shown in FIG. 5a. The gray color shows the indeterminate pixels that are not included in either foreground or background subsets.

FIG. 5e illustrates the estimated probability map for the image shown in FIG. 5a.

FIG. 5f. illustrates the probability values greater than 0.5, indicating the pixels more likely to be vessels than being background, for the image shown in FIG. 5a.

Figure 6:
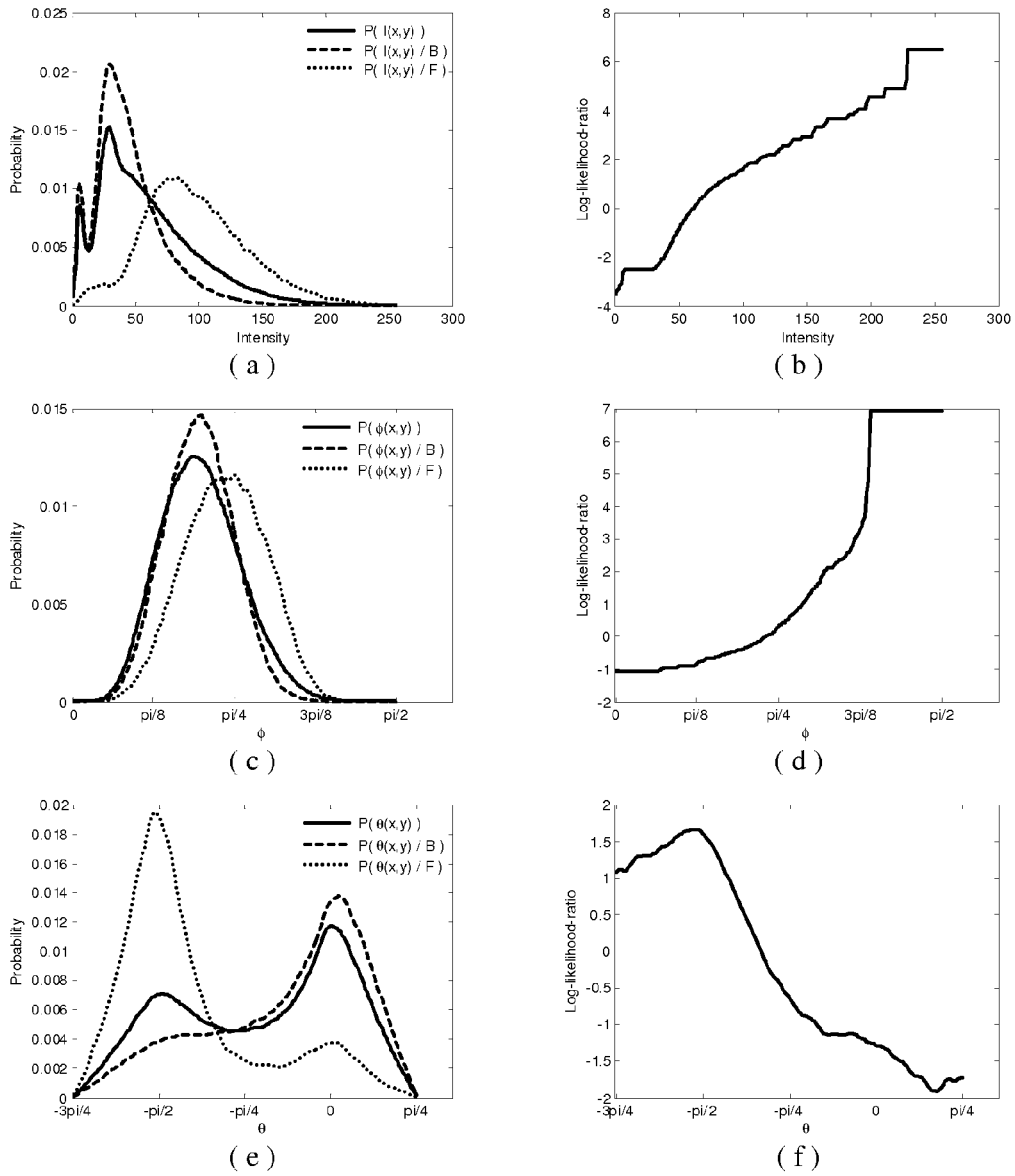

FIGS. 6a-6f illustrate the estimated class conditional distribution and log-likelihood functions of the membrane image shown in FIG. 5a: a) illustrates the distribution functions of the intensity, c) illustrates the normalized-curvature index, e) illustrates the shape index. For FIGS. 6a, 6c and 6e, the distribution of foreground, background and all pixels are plotted with dotted, dashed, and solid lines, respectively. FIG. 6b illustrates the estimated log-likelihood functions based on the intensity, FIG. 6d illustrates the normalized-curvature index, and FIG. 6f illustrates the shape index.

Figure 7:
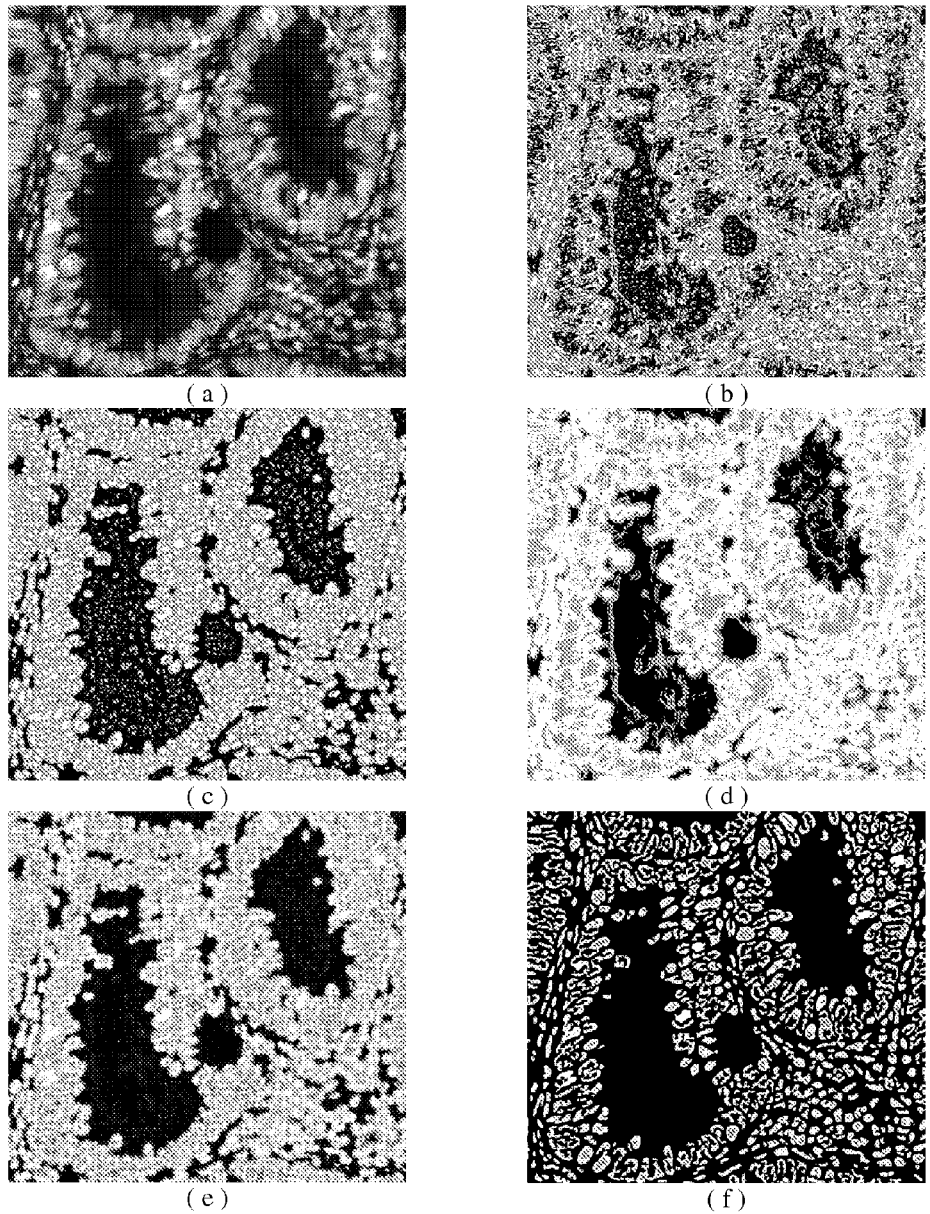

FIG. 7a illustrates an image of a nuclei marker and estimated foreground subsets (white color) and background subsets (black color) based on two of the features used in this example FIG. 7b illustrates the segmented foreground pixels based on the shape index and normalized-curvature index for the image shown in FIG. 7a.

FIG. 7c illustrates the segmented foreground pixels based on the shape index and intensity for the image shown in FIG. 7a FIG. 7d illustrates the segmented foreground pixels based on the intensity and normalized-curvature index for the image shown in FIG. 7a. The gray color shows the indeterminate pixels that are not included in either foreground or background subsets.

FIG. 7e illustrates the estimated probability map from the empirical log-likelihood function for the image shown in FIG. 7a.

FIG. 7f illustrates the probability map from the parametric log-likelihood function, for the image shown in FIG. 7a.

Figure 8:
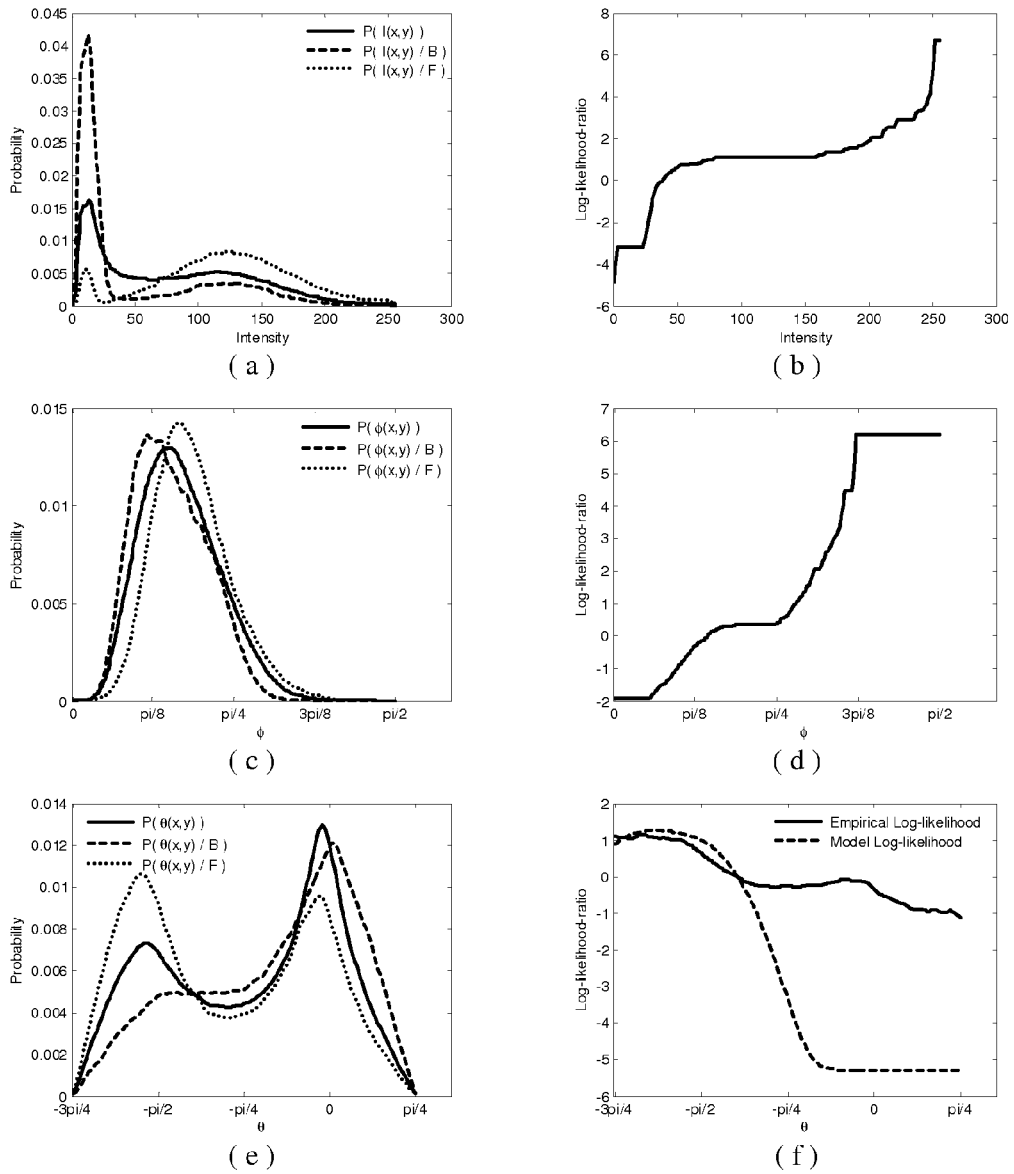

FIGS. 8a-8f illustrate the estimated class conditional distribution and log-likelihood functions of the nuclei image shown in FIG. 7a: a) illustrates the distribution functions of the intensity, c) illustrates the normalized-curvature index, e) illustrates the shape index. For FIGS. 8a, 8c and 8e, the distribution of foreground, background and all pixels are plotted with dotted, dashed, and solid lines, respectively. FIG. 8b illustrates the estimated log-likelihood functions based on the intensity, FIG. 8d illustrates the normalized-curvature index, and FIG. 8f illustrates the empirical and the model based log-likelihood functions of the shape index which are represented with solid and dashed lines, respectively.

Figure 9:
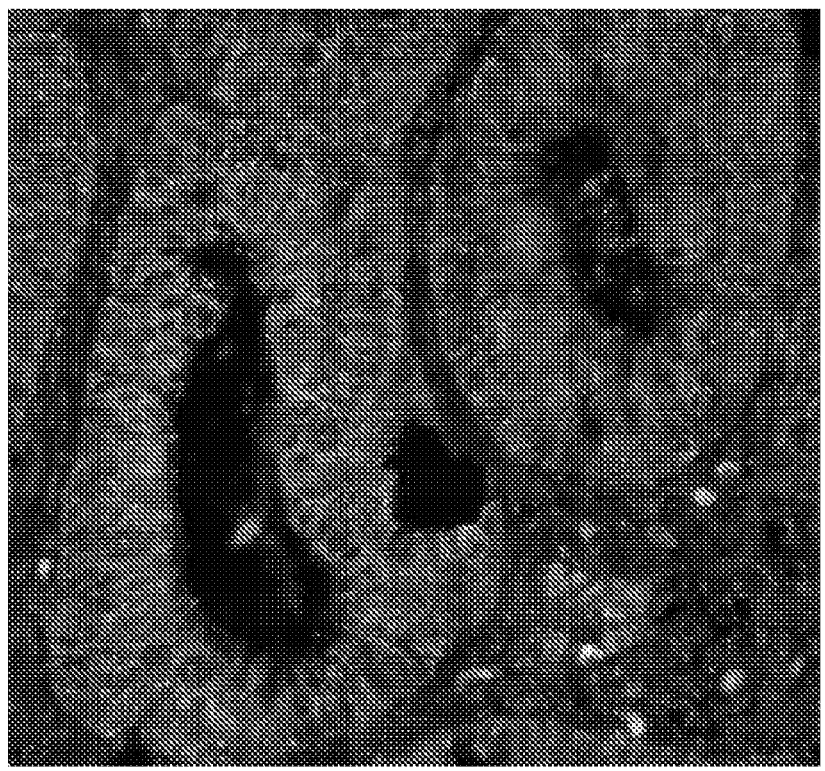
Figure 9:
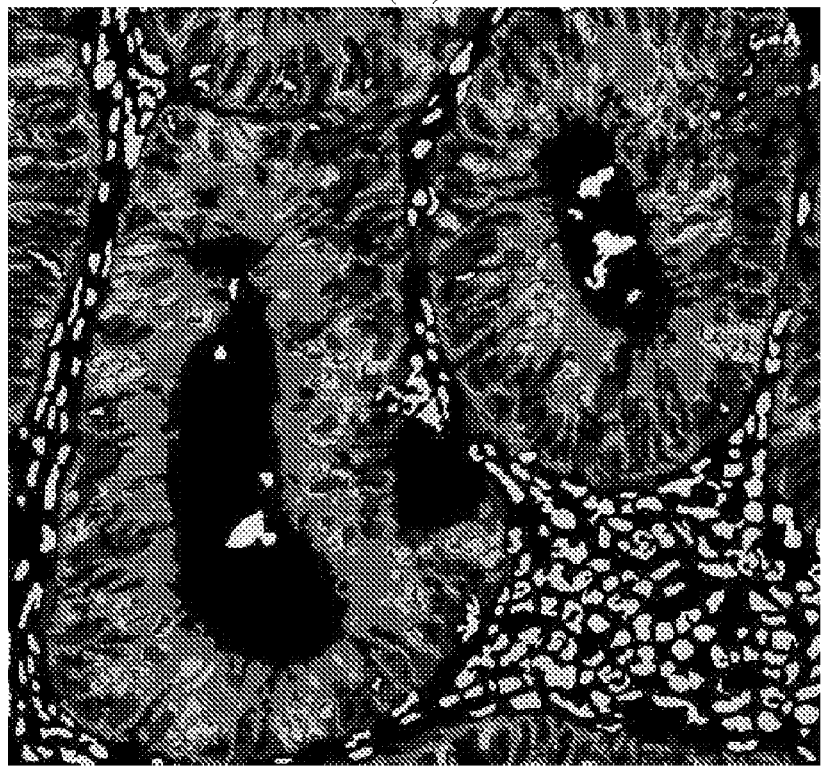

FIG. 9a illustrates an example of raw image intensities for membrane, nuclei and c-Met markers.

FIG. 9b illustrates the detected compartments for the membrane, epithelial nuclei, stromal nuclei and cytoplasm for the image shown in FIG. 9a.

FIG. 10a illustrates an example of raw image intensities for a retinal image.

FIG. 10b illustrates the detected vasculature network for the image shown in FIG. 10a.

Figure 11:
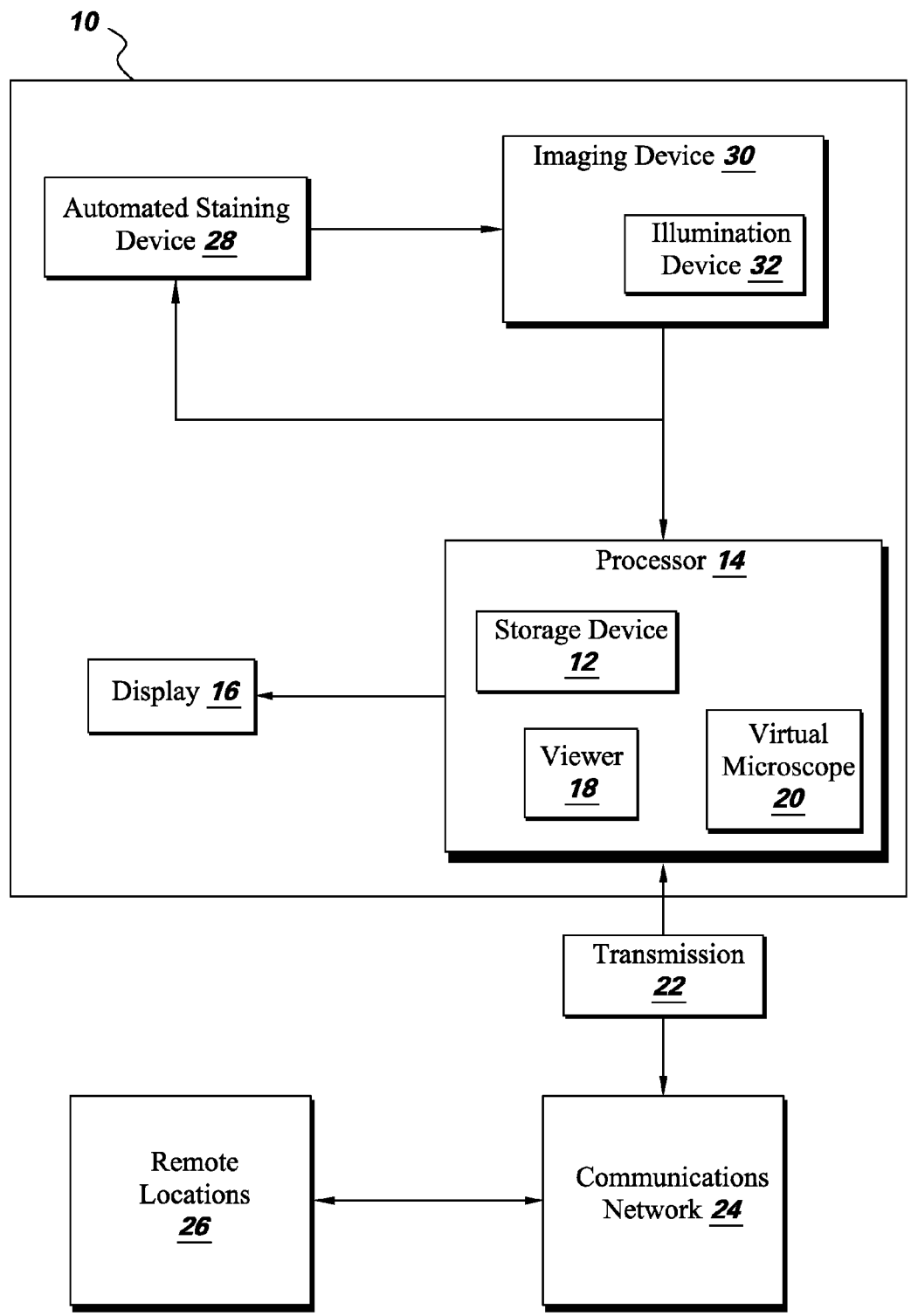

FIG. 11 is an embodiment of the system.

DETAILED DESCRIPTION

The quantitation of biomarkers can be accomplished without giving definite decisions for each pixel, but rather computing the likelihood of a pixel belonging to a region. For example, instead of identifying membrane pixels, the likelihood of a pixel being a membrane can be computed, which is essentially the probability of a pixel being a membrane. Such probability maps can be computed using the intensity and geometry information provided by each channel. A likelihood function estimator that calculates the probability maps of membranes and nuclei structures in images is presented. Starting from known initial geometric constraints, the algorithm iteratively estimates empirical likelihood functions of curvature and intensity based features. The distribution functions are learned from the data. This is different than existing parametric approaches, because it can handle arbitrary mixtures of blob-like and ridge-like structures. In applications, such as tissue imaging, a nuclei image in an epithelial tissue comprises, both ridge-like and blob-like structures. Network of membrane structures in tissue images is another example where the intersection of ridges can form structures that are partially blobs. Accurate segmentation of membrane and nuclei structures forms the base for higher level scoring and statistical analysis applications. For example, distribution of a target protein on each of the segmented compartments can be quantified to reveal protein specific pathways. Then the pathway can be related to clinical outcomes.

Retina images are used to illustrate this example embodiment, and are used only to illustrate one or more of the steps of the methods and systems described. Although the steps of the methods are illustrated in this example in connection with the elongated vascular structures of the retina, the steps are equally applicable to other tissues and biological structures.

Eigenvalues of the hessian matrix are used in this example embodiment to detect ridge-like and blob-like structures. Although such eigenvalues are used in this example because of their invariance to rigid transformations, other known feature detection algorithms may be used. The Hessian of an image I(x, y) is defined as $$H(I(x, y)) = \begin{bmatrix} \frac{\partial^2 I(x, y)}{\partial x^2} & \frac{\partial^2 I(x, y)}{\partial x \partial y} \\ \frac{\partial^2 I(x, y)}{\partial y \partial x} & \frac{\partial^2 I(x, y)}{\partial y^2} \end{bmatrix}. \quad (1)$$

The eigenvalues ($\lambda_1(x, y) \leq \lambda_2(x, y)$) of the Hessian matrix can either be numerically calculated or analytically written in terms of the elements the Hessian Matrix;

$$\lambda_{12}(x, y) = \frac{1}{2}\left\{\frac{\partial^2 I(x,y)}{\partial x^2} + \frac{\partial^2 I(x,y)}{\partial y^2} \mp \sqrt{\left(\frac{\partial^2 I(x,y)}{\partial x^2} - \frac{\partial^2 I(x,y)}{\partial y^2}\right)^2 + 4\frac{\partial^2 I(x,y)}{\partial x \partial y}}\right\}. \quad (2)$$

Figure 1:
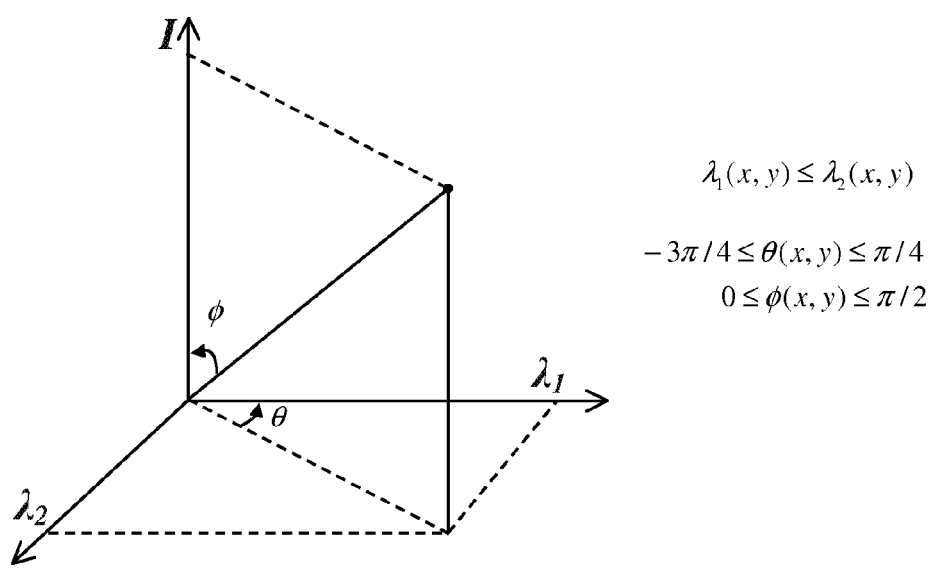
FIG. 1 illustrates eigenvalues and intensity when used in a spherical coordinate system.

The eigenvalues encode the curvature information of the image, and provide useful cues for detecting ridge type membrane structures, or blob type nuclei structures. However the eigenvalues depend on image brightness. Below are two examples of curvature based features that are independent of image brightness;

$$\theta(x, y) = \tan^{-1}\left(\frac{\lambda_1(x,y)}{\lambda_2(x,y)}\right), \quad (3)$$

$$\phi(x, y) = \tan^{-1}\frac{(\lambda_1(x,y)^2 + \lambda_2(x,y)^2)^{1/2}}{I(x,y)}, \quad (4)$$

and refer them as shape index, and normalized-curvature index respectively. This is essentially the same defining the eigenvalues in a polar coordinate system (See FIG. 1). This transformation also results in bounded features, $$-\frac{3\pi}{4} \leq \theta(x, y) \leq \frac{\pi}{4},$$

and $0 \leq \phi(x, y) \leq \pi/2$.

The image intensity I(x, y) is a significant information source. However, due to brightness variations across different images and within the same image, it is difficult to determine right intensity thresholds, and parameters to adjust for these variations. An intensity histogram of a retina image (FIG. 2a) is plotted in FIG. 3a (solid line). Due to large variations of the intensity, the histogram is far from a clear bimodal distribution. A simple thresholding test reveals such intensity variations. FIG. 4b shows segmented pixels that have intensity value above a certain threshold. FIGS. 4c and 4d shows the dramatic change in the segmentation results when this threshold value is decreased or increased by 5%.

Using known geometric cues, an initial segmentation based on the shape index and the normalized-curvature index separates the image pixels into three subsets: background, foreground, and indeterminate. Indeterminate subset comprises all the pixels that are not included in the background or foreground subsets. From these subsets, the background and foreground intensity distributions, as well as the intensity log-likelihood functions are estimated. The example algorithm used in this embodiment continues iterating by using two out of the three features at a time to estimate the distribution of the feature that is left out. Usually three iterations are usually sufficient for a convergence. As described below, these log-likelihood functions are combined in this embodiment to determine the overall likelihood function. A probability map that represents the probability of a pixel being a foreground may then be calculated.

The log-likelihood functions are estimated based on the assumption that the intensity and the feature vectors defined in Equations 3 and 4 are independent. Notice that these equations are normalized such that they measure a ratio rather than absolute values. The arctangent operation in these equations maps these measures onto a bounded space. If the overall image brightness is increased or decreased, these metrics stay unchanged. Starting with initial log-likelihoods determined based on the known geometry of the ridge-like or blob-like structures, the algorithm uses two out of these three feature sets to estimate the class membership of each pixels (foreground, background, or indeterminate), and use the pixel classes to estimate the class conditional probability, and the log-likelihood of the third feature. This procedure is repeated, either for a certain number of iterations or convergence in log-likelihood functions is achieved.

The following table illustrates example embodiments of algorithms that may be used in the methods and systems. In Step-A, the class memberships are determined based on two of the three features. Note that the union of the foreground pixels, $S^F$, and the background pixels, $S^B$, is a subset of all the pixels. In other words, subsamples are taken from the dataset in which there is a higher confidence that class membership may be determined. In this embodiment, only these points are then used to estimate log-likelihood function of the other feature. In Step-B, the decision boundary is estimated along the direction of the feature that is not used in Step-A. Although not necessary for the estimation of the log-likelihood functions, the decision boundaries can be used for enforcing monotonicity constraints for some of the log-likelihood functions. Step-C estimates the log-likelihood functions as a function of the class conditional functions. For the intensity and normalized-curvature index, the monotonicity constraints are enforced. In this embodiment, this implies that, for example for the intensity feature, the brighter a pixel is the more likely it is to be on a foreground.

---

Define $f_1(x, y) = I(x, y)$, $f_2(x, y) = \phi(x, y)$, $f_3(x, y) = \theta(x, y)$
Compute initial log-likelihood functions $L(f_2(x, y))$, and $L(f_3(x, y))$
    do
        for k=1:3
            A. Estimate the foreground and background sets using two sets of features
                $S^F = \{(x, y): L(f_i(x, y)) \geq \epsilon_i, L(f_j(x, y)) \geq \epsilon_j\}$
                $S^B = \{(x, y): L(f_i(x, y)) \leq -\epsilon_i, L(f_j(x, y)) \leq -\epsilon_j\}$
                where $(i, j) \in \{1, 2, 3\}$, $i \neq j \neq k$
            B. Estimate the decision boundaries $\hat{T}_k$
            C. Estimate the log-likelihood function $$L(f_k(x, y)) = \log\left(\frac{P((x, y) \in S^F / f_k(x, y))}{P((x, y) \in S^B / f_k(x, y))}\right) \approx \log\left(\frac{P(f_k(x, y)/(x, y) \in S^F)}{P(f_k(x, y)/(x, y) \in S^B)}\right)$$

Enforce monotonic increasing constraint for the shape index and the
            normalized-curvature index
        end for
    until stopping criteria met The initial log-likelihood functions are defined in this embodiment as $$L(f_2(x,y)) = 2\epsilon_2(U(\phi(x,y) - \phi_M) - 0.5). \tag{5}$$

$$L(f_3(x,y)) = \epsilon_3(U(\theta(x,y) - \theta_L) - U(\theta(x,y) - \theta_U) - U(\theta(x,y))), \tag{6}$$

where U is the unit step function, and $\epsilon_i$ are the likelihood thresholds for each feature. Now using these initial log-likelihoods, the sets in Step-A would be equivalent to the following sets, $$S^F = \{(x,y): \theta_L \leq \theta(x,y) \leq \theta_U, \phi(x,y) > \phi_M\} \tag{7}$$

$$S^B = \{(x,y): \theta(x,y) \geq 0, \phi(x,y) \leq \phi_M\}, \tag{8}$$

where $\theta_L = -3\pi/2$, $\theta_U = -\pi/2$ for blobs, and $\theta_L = -\pi/2 - \Delta_1$, $\theta_U = -\pi/2 + \Delta_2$ for ridges. These parameters can be easily derived for different geometric structures. For example, for bright blobs on a dark background, both eigenvalues are negative, hence the angle between them is less than $-\pi/2$. Since the angle is relative to the larger eigenvalue, it is bounded by $-3\pi/2$. The ridge margins are at small angles, $\Delta_1$ and $\Delta_2$, for straight ridges they are equal. For the initial sets, subsamples are taken from $\theta \geq 0$ to observe background pixels. Note that due to noise, the background pixels can have any curvature index. However, in this embodiment only a subset with positive polar curvature is sufficient to estimate the intensity distribution for the background pixels. An initial threshold for normalized-curvature index, $\phi_M$, is set to the median value of all the normalized-curvature index values.

Figure 3:
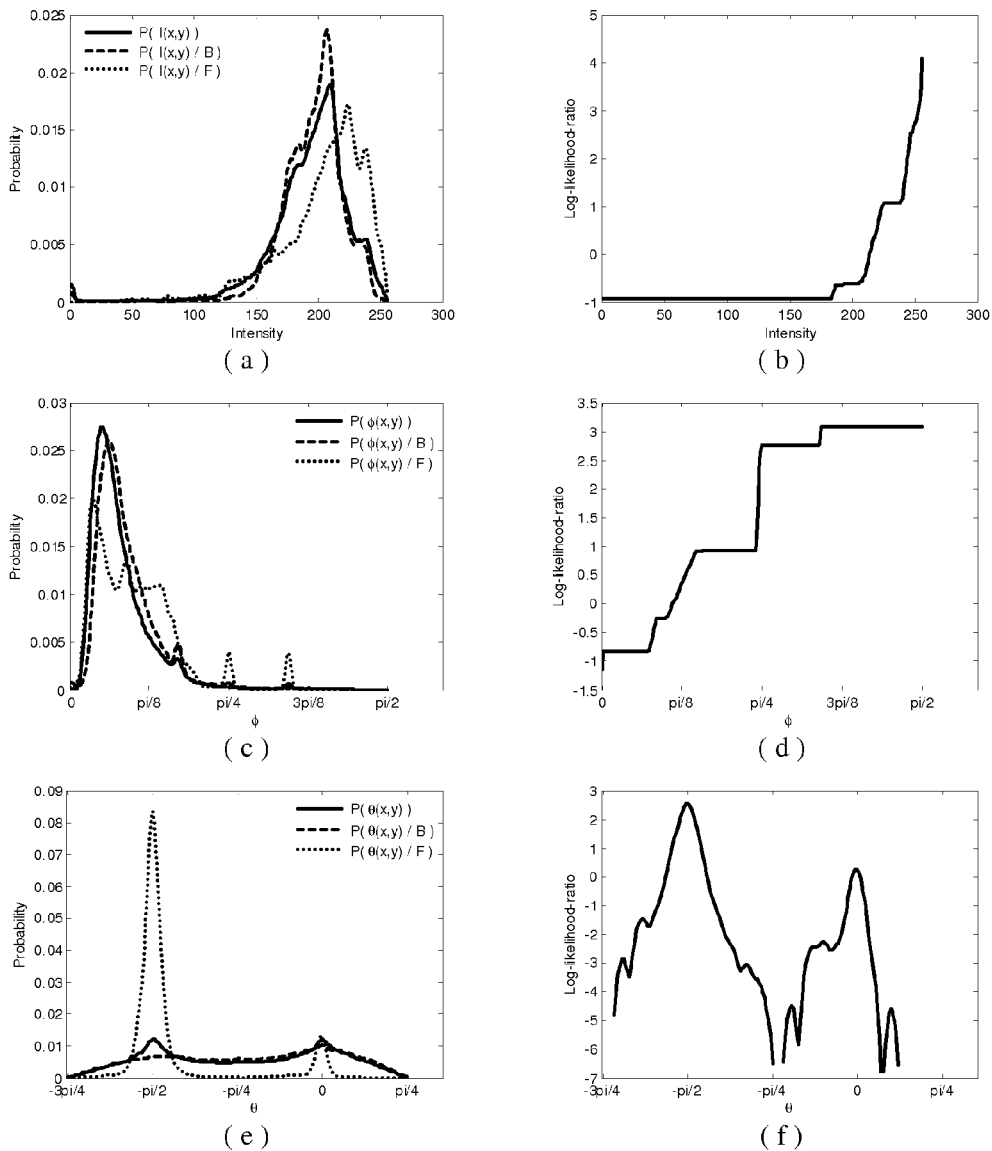

FIG. 2b shows the initial background (black), foreground (white), and indeterminate (gray) subsets computed using the shape index and the normalized-curvature index for the image shown in FIG. 2a. These initial subsets are typically not complete (has many false negatives), but they typically have very few false positives. As such, they provide enough information to estimate the distribution of the feature (intensity) that is left out. From these subsets, class conditional distribution functions, and the log-likelihood functions of the intensity for the background and the foreground are estimated and shown in FIG. 3a (dashed plot) and (dotted plot), respectively. Given the estimated initial sets, $S^F$, and $S^B$, the class conditional intensity distribution of the foreground, $P(I(x, y)/(x, y) \in S^F)$, and the background, $P(I(x, y)/(x, y) \in S^B)$ are estimated. The dotted plots and dashed plots in FIGS. 3a, 6a, and 8a, show the estimated intensity distributions of blob-like and ridge like images from the initial subsets shown in FIGS. 2b, 5b, and 7b, respectively.

Next, given the initial log-likelihood function of the shape index, and the estimated log-likelihood function of the intensity, the background/foreground subsets may be recomputed, as shown in FIG. 2c. The class conditional distribution functions are estimated using these subsets (FIG. 3c), as well as the log-likelihood function (FIG. 3d) for the normalized-curvature index. The monotonicity constraint is imposed in this example for the log-likelihood function of the normalized-curvature index, implying that the foreground has a higher curvature for a given intensity value than the background. FIGS. 5c and 7c show the subsets derived from intensity and shape index for membrane and nuclei structures, shown in FIG. 5a and FIG. 7a, respectively. The class conditional density functions are shown in FIGS. 6c and 8c; and the log-likelihood functions are shown in FIGS. 6d and 8d.

In one iterative embodiment, the same procedure is repeated for the shape index. The estimated log-likelihood functions for the intensity and the normalized-curvature index are used to form the background/foreground subsets, FIG. 2d. Then, based on these subsets the class conditional functions, and log-likelihood functions are estimated as shown in FIGS. 3e and 3f, respectively. The significant peak at $-\pi/2$ in FIG. 3e for the vessel pixels is as expected, because in this example for vessels, one eigenvalue is zero and one eigenvalue is negative. The small peak at zero is due to the valley type structures in between two vessels that are close by in the bright regions of the image. FIGS. 5d and 7d show the subsets for the membrane and nuclei images. The estimated functions using these subsets are shown in FIGS. 6e-f, and 8e-f. In the membrane class conditional functions (FIG. 6e), the foreground peak is at an angle slightly less than $-\pi/2$, and foreground class conditional function is significantly higher than the background class condition function for all values smaller than $-\pi/2$. Although initialized differently, the nuclei class conditional functions in this example converge similar to membrane distribution functions. This is due to significant amount of ridge-like structures in the epithelial nuclei. Although the proportion of the mixtures between blobs and ridges is different, the algorithm used in this example learns the likelihood densities from the data. The monotonicity constraint is used to stabilize the convergence of the algorithm.

The monotonicity constraint is imposed by first estimating the decision boundaries. An optimal intensity threshold for the intensity and the normalized-curvature index are estimated by maximizing the a Posteriori Probabilities (MAP), $$\hat{T}_k = \arg\max_T \ P(I(x, y) \geq T / (x, y) \in S^F) + \tag{9}$$

$$P(I(x, y) < T / (x, y) \in S^B) \text{ for } k = 1, 2.$$

In this example, the goal is to minimize the overall error criteria when the a priori distributions for the background and the foreground are equal. Since an estimate is known, from this example, for the class conditional distributions, the value of the decision threshold is determined by a one-dimensional exhaustive search, rather than any parametric approximations. While there is only one decision boundary along the intensity, and normalized-curvature index dimensions, there can be multiple boundaries along the shape index feature. Therefore, a monotonicity constraint is not imposed on the log-likelihood function of the shape index in this example.

Although the log-likelihood functions are estimated in this example in Step-C, for small values of numerator and denominator, this expression can become undefined or unstable. Therefore, a modified empirical log-likelihood function is defined by imposing the non-decreasing constraint as follows, $$L^*(f_k(x, y)) = \tag{10}$$

$$\begin{cases} sup(L(f_k(x, y)), L^*(f_k(x, y) - \Delta)) & f_k(x, y) > \hat{T}_k \\ L(f_k(x, y)) & f_k(x, y) = \hat{T}_k, \text{ for } k = 1, 2 \\ inf(L(f_k(x, y)), L^*(f_k(x, y) + \Delta)) & f_k(x, y) < \hat{T}_k \end{cases}$$

where $\Delta$ is the bin size of the histogram used to estimated the intensity distributions. Equation 10 is calculated recursively starting from $\hat{T}_k$ estimated by Equation 9. This is used in this example to ensure that the estimated empirical log-likelihood function does not change the decision boundary when the log-likelihood function ($L^*(f_k(x, y)) = 0$) is used for decision. In the above example equation, the index, k, is defined for the first two features, not for all of them, therefore excluding the shape index. Example empirical non-decreasing intensity log-likelihood functions are shown in FIGS. 3b, 3d, 6b, 6d, 8b, and 8d for vessel, membrane, and nuclei structures. The algorithm used in this example, repeats Steps A-C for all features until a stopping criterion is met. The methods and systems are not limited to these criteria. Different stopping criteria can be defined, such as, but not limited to, the rate of change in the estimated decision boundaries. This example algorithm tends to converge in three interations when used in connection with images of membranes and nuclei. Therefore, in this example three iterations were used.

The methods and systems described may be used to process and analyze many different kinds of images for any number and type of purposes depending on the analytical tools desired for a given application. The methods and systems are particularly useful for analyzing images that comprise blob-like and/or ridge-like structures, or other similar structures that can be differentiated from one another based at least in part on shape, geographical and/or topographical features. For example, such images may include, but are not limited to, images of biological structures and tissues. For example, the methods and systems are useful for differentiating structures and tissues comprising vascular features, neural features, cellular and subcellular features.

Building again upon the assumption that the features are independent, the joint log-likelihood function can be computed from the individual log-likelihood functions, $$L(x,y) = \log\left(\frac{P((x,y) \in S^F / I(x,y)\phi(x,y)\theta(x,y))}{P((x,y) \in S^B / I(x,y)\phi(x,y)\theta(x,y))}\right) \quad (11)$$

$$= \log\left(\frac{P((x,y) \in S^F / I(x,y))P((x,y) \in S^F / \phi(x,y))}{P((x,y) \in S^B / I(x,y))P((x,y) \in S^B / \phi(x,y))} \cdot \frac{P((x,y) \in S^F / \theta(x,y))}{P((x,y) \in S^B / \theta(x,y))}\right)$$

$$= L(I) + L(\phi) + L(\theta)$$

$$L(I) = \log\left(\frac{P((x,y) \in S^F / I(x,y))}{P((x,y) \in S^B / I(x,y))}\right)$$

$$L(\phi) = \log\left(\frac{P((x,y) \in S^F / \phi(x,y))}{P((x,y) \in S^B / \phi(x,y))}\right)$$

$$L(\theta) = \log\left(\frac{P((x,y) \in S^F / \theta(x,y))}{P((x,y) \in S^B / \theta(x,y))}\right)$$

A probability map representing the probability of a pixel being a foreground may be calculated from the joint log-likelihood functions as follows, $$P((x,y) \in S^F / I(x,y)\phi(x,y)\theta(x,y)) = \frac{e^{L(x,y)}}{1 + e^{L(x,y)}}. \quad (12)$$

FIGS. 2e, 5e, and 7e show the estimated probability maps for vessel, membrane, and nuclei images, respectively. In this example, as shown in FIG. 3b, the previously determined threshold is used as the optimal decision boundary. A binary decision map may then be computed by thresholding this probability map, such as using 0.5 as the decision criterion, (FIGS. 2f, 5f).

While the estimated binary decision maps for the vessel and membrane structures comprise accurate segmentation boundaries, the nuclei decision map tends to result in over-segmented regions. This is due to the large amount of light scattering around the nuclei, particularly in between compactly located epithelial nuclei, and inside the ring shaped epithelial nuclei where the scattered light makes relatively bright regions. Since the regions in between nearby nuclei and inside ring nuclei have high curvature and high intensity, these regions adversely contribute to the class conditional estimation of the shape index. A model-based likelihood function that deemphasizes the unexpected geometric structures is fitted to the nuclei log-likelihood functions. The dashed line in FIG. 8f shows such a function modeled by the sum of two Gaussian functions, where their parameters are estimated from the data values less than $-\pi/2$, and with a fixed lower bound set to $e^{-5}$. The resulting probability map is shown in FIG. 7f. A connected component analysis and hole filing algorithm fills in the hollow epithelial nuclei centers. The probability value is set to 0.5 (gray color in FIG. 7f) for the filled in values, so that they are defined as nuclei pixel in the binary decision map. Based on the quantitation task, the empirical likelihood functions or the model-based likelihood functions may be used. In this example, the model-based function is used because it results in isolated nuclei segments that may be used to differentiate the epithelial nuclei from the stromal nuclei for use in the following example for detecting epithelial nuclei.

Many molecular markers target either epithelial nuclei or stromal nuclei. Current practice in molecular imaging uses biomarkers such as keratin to differentiate the epithelial tissue from the stromal tissue. However, in this example, the curvature based methods obviate the need for markers to differentiate epithelial tissue from stromal tissue. As a result, the staining process is less complex and makes the biological and optical resources available for multiplexing other targets. The example computational algorithms used in one or more of the example embodiments, exploit the knowledge that epithelial nuclei have membrane structures surrounding them. The nuclei in the epithelial tissue are larger and more densely populated than nuclei in the stromal tissue.

The morphological differences between epithelial and stromal nuclei may be defined in this example, which is for illustration only, by identifying a superset of the nuclei, cytoplasm, and membrane set. For example, S(x, y), when used to denote this superset, may be defined as the union of the detected compartments, $$S(x,y) = C(x,y) \cup M(x,y) \cup N(x,y), \quad (13)$$

where C(x, y), M(x, y), and N(x, y) denote cytoplasm, membrane, and nuclei pixels. Cytoplasm, in this example, is defined as the union of set of small regions circumscribed by membrane and nuclei pixels. Since the stromal nuclei are not connected through membrane structures, and are sparsely distributed, they can be detected by a connected component analysis of S(x, y). An epithelial mask, E(x, y), may be generated as a union of large connected components of S(x, y). For the sample images in this example, any connected component larger than 800 pixels is accepted as a part of the epithelial mask. The nuclei set is then separated into epithelial nuclei ($N_e(x, y)$) and stromal nuclei ($N_s(x, y)$) by masking, $$N_e(x,y) = N(x,y) \cdot E(x,y), \quad (14a)$$

$$N_s(x,y) = N(x,y) \cdot (1 - E(x,y)). \quad (14b)$$

FIG. 9b shows the computed different regions: membrane, epithelial nuclei, stromal nuclei, and cytoplasm. The epithelial nuclei shown in FIG. 9B are clearly differentiated from the stromal nuclei.

As noted, the methods and systems may be used in a variety of applications. Segmenting digital images of tissue microarrays is an example of one such application. In this example, multiple channel digital images are segmented into multiple regions (segments/compartments) as one of the steps for quantifying one or more biomarkers. In this example, the quantitation is accomplished without having to make definite decisions for each pixel, but rather by determining the likelihood that a given pixel belongs to a region. For example, instead of identifying membrane pixels, the likelihood of a pixel being a membrane can be computed. This likelihood represents the probability that a given pixel is belongs to a membrane region. Probability maps of these regions may be computed using the intensity and geometry information derived from each channel. For example, FIG. 9a shows the measured intensities of a multiple channel image, showing the nuclear stain (Dapi), the membrane stain (Pan-cadherin), and a target protein (cMet). The probability maps computed for the nuclei and membrane are shown in FIGS. 7f and 5e, respectively. The brightness on these images represents the probability value: white representing the probability value of one, black representing the probability value of zero, and any shade of gray being proportional with the probability value. A definite decision for each pixel can be easily determined by thresholding the probability maps. Such decisions are used to separate the epithelial nuclei from the stromal nuclei, and to detect the cytoplasm. The cytoplasm is also represented as a probability map of ones and zeros. FIG. 9b shows the computed different regions for membrane, epithelial nuclei, stromal nuclei, cytoplasm. The background and the extra cellular matrix are shown as black.

Translocation of a target protein between different regions can be quantified based on the probability maps. The distribution of a target protein (cMet) on each of the regions can be represented by a probability distribution functions (PDF). For example the PDF of the cMet on the membrane is the weighted empirical distribution of the cMet, where the membrane probability map determines weights. A translocation score may then be generated based on one or more or pairs of regions. In this example, there are five regions (membrane, epithelial nuclei, stromal nuclei, cytoplasm, and extra cellular matrix). The translocation score is defined, in this example, as the normalized mean difference between the corresponding PDFs. These translocation scores may be used to reflect clinical outcome or to explore the association with life expectancy.

Figure 10:
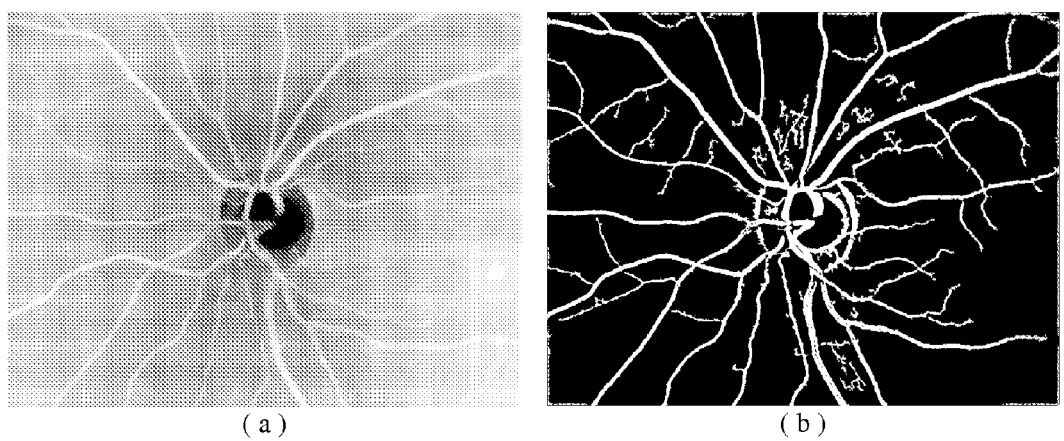

As noted, the methods and systems may be used to analyze a variety of images. The microscopy images, used in this example, may be calibrated in advance by using fluorescent calibration targets. Such calibration may not possible for some images, such as the retinal image. However, illumination correction techniques may be applied to correct such variations. A commonly used illumination correction technique is homomorphic filtering defined as, $$I'(x,y)=\exp(\log(I(x,y))-\log((I(x,y)*G(x,y))), \quad (15)$$

where I'(x, y) is the new corrected image, G(x, y) is a Gaussian filter, and * is a convolution operation. By replacing the image with the corrected intensities, images with large intensity variations can be segmented more accurately using the same algorithms described. To eliminate any artifacts introduced by the homomorphic filtering, the shape index and the normalized-curvature index is preferably calculated from the original intensity values. FIG. 10 shows the segmentation result of the retina image using the corrected intensity values.

While only certain features of the invention have been illustrated and described herein, many modifications and changes will occur to those skilled in the art. It is, therefore, to be understood that the appended claims are intended to cover all such modifications and changes as fall within the true spirit of the invention.

The automated system 10 (FIG. 11) for carrying out the methods generally comprises: a storage device 12 for at least temporarily storing one or more images; and a processor 14 that categorizes the pixels into a plurality of subsets using one or more indexes, determines an intensity distribution and log-likelihood function of one or more of the subsets, and generates one or more maps based on the determination of the log-likelihood function of one or more of the subsets. The images may comprise, but are not limited to, blob-like and ridge-like structures. For example, one or more of the blob-like structures may comprise at least a portion of a nucleus and one or more of the ridge-like structures may comprise at least a portion of a membrane. One or more of the maps may be a probability map of one or more of the blob-like structures and the ridge-like structures. The image may comprise, but is not limited to, one or more structures selected from a group consisting of: cellular structures, vascular structures, and neural structures.

The storage device may comprise, but is not necessarily limited to, any suitable hard drive memory associated with the processor such as the ROM (read only memory), RAM (random access memory) or DRAM (dynamic random access memory) of a CPU (central processing unit), or any suitable disk drive memory device such as a DVD or CD, or a zip drive or memory card. The storage device may be remotely located from the processor or the means for displaying the images, and yet still be accessed through any suitable connection device or communications network including but not limited to local area networks, cable networks, satellite networks, and the Internet, regardless whether hard wired or wireless. The processor or CPU may comprise a microprocessor, microcontroller and a digital signal processor (DSP).

In one of the embodiments, the storage device 12 and processor 14 may be incorporated as components of an analytical device such as an automated high-throughput system that stains and images tissue micro arrays (TMAs) in one system and still further analyzes the images. System 10 may further comprise a means for displaying 16 one or more of the images; an interactive viewer 18; a virtual microscope 20; and/or a means for transmitting 22 one or more of the images or any related data or analytical information over a communications network 24 to one or more remote locations 26.

The means for displaying 16 may comprise any suitable device capable of displaying a digital image such as, but not limited to, devices that incorporate an LCD or CRT. The means for transmitting 22 may comprise any suitable means for transmitting digital information over a communications network including but not limited to hardwired or wireless digital communications systems. The system may further comprise an automated device 28 for applying one or more of the stains and a digital imaging device 30 such as, but not limited to, an imaging microscope comprising an excitation source 32 and capable of capturing digital images of the TMAs. Such imaging devices are preferably capable of auto focusing and then maintaining and tracking the focus feature as needed throughout processing.

The invention claimed is:

1. A method for segmenting images comprising one or more structures, comprising the steps of,
   providing an image comprising a plurality of pixels;
   categorizing said pixels into a plurality of subsets using one or more indexes wherein at least one of said indexes comprises a shape index, wherein said shape index comprises a curvature based feature comprising $$\theta(x, y) = \tan^{-1}\left(\frac{\lambda_1(x, y)}{\lambda_2(x, y)}\right)$$

wherein x and y are image coordinates, $\lambda_1$ is an extent of curvature along a lowest curvature direction, $\lambda_2$ is an extent of curvature along a highest curvature direction, $\theta$ is an azimuth angle, $\lambda_1(x, y) \leq \lambda_2(x, y)$ and $$-\frac{3\pi}{4} \leq \theta(x, y) \leq \frac{\pi}{4};$$

determining a log-likelihood function of one or more of said indexes;
   generating one or more maps of one or more structures in the image based on said determination of said log-likelihood function of one or more of said indexes; and
   displaying one or more of the structures on a display device.

2. A method for segmenting images comprising one or more structures, comprising the steps of,
   providing an image comprising a plurality of pixels;
   categorizing said pixels into a plurality of subsets using one or more indexes wherein at least one of said indexes comprises a normalized-curvature index;
   determining a log-likelihood function of one or more of said indexes;
   generating one or more maps of one or more structures in the image based on said determination of said log-likelihood function of one or more of said indexes; and
   displaying one or more of the structures on a display device wherein said normalized-curvature index comprises a curvature based feature comprising $$\phi(x, y) = \tan^{-1}\frac{(\lambda_1(x, y)^2 + \lambda_2(x, y)^2)^{1/2}}{I(x, y)}$$

wherein x and y are image coordinates, $\lambda_1$ is an extent of curvature along a lowest curvature direction, $\lambda_2$ is an extent of curvature along a highest curvature direction, $\phi$ is a zenith angle, $\lambda_1(x, y) \leq \lambda_2(x, y)$, $I(x, y)$ is an image intensity, and $0 \leq \phi(x, y) \leq \pi/2$.

3. A method for segmenting images comprising one or more structures, comprising the steps of,
   providing an image comprising a plurality of pixels;
   categorizing said pixels into a plurality of subsets using one or more indexes, wherein said pixels are categorized using at least three of said indexes;
   determining a log-likelihood function of one or more of said indexes comprising estimating said log-likelihood function of one or more of said indexes and using two out of said three indexes, for an iteration of said step of determining said log-likelihood function, to estimate said log-likelihood of said third index;
   generating one or more maps of one or more structures in the image based on said determination of said log-likelihood function of one or more of said indexes; and
   displaying one or more of the structures on a display device.

4. The method of claim 3, wherein said three subsets comprise background, foreground and indeterminate pixels.

5. The method of claim 3, wherein said log-likelihood is estimated for at least one of said subsets at least in part by estimating one or more decision boundaries.

6. The method of claim 5, wherein one or more of said decision boundaries are used to apply one or more monotonicity constraints for one or more log-likelihood functions.

* * * * *